United States Patent
Huang et al.

(10) Patent No.: US 8,325,476 B2
(45) Date of Patent: Dec. 4, 2012

(54) ELECTRONIC DEVICE CARRIER

(75) Inventors: Chih-Hua Huang, Shulin (TW);
Ching-Hui Chang, Banciao (TW);
Ko-Hsien Lee, Dayuan Township (TW);
Ching-Feng Hsieh, Taipei (TW)

(73) Assignee: Askey Computer Corp. (TW)

( * ) Notice: Subject to any disclaimer, the term of this patent is extended or adjusted under 35 U.S.C. 154(b) by 389 days.

(21) Appl. No.: 12/703,214

(22) Filed: Feb. 10, 2010

(65) Prior Publication Data
US 2011/0149486 A1 Jun. 23, 2011

(30) Foreign Application Priority Data

Dec. 17, 2009 (TW) ................................ 98143445 A

(51) Int. Cl.
*G06F 1/16* (2006.01)
(52) U.S. Cl. .............. 361/679.41; 361/679.43; 710/303; 710/304; 312/223.1; 312/223.2
(58) Field of Classification Search .............. 361/679.41
See application file for complete search history.

(56) References Cited

U.S. PATENT DOCUMENTS

| 5,408,382 | A  | * | 4/1995  | Schultz et al. ........... 361/679.41 |
| 5,627,727 | A  | * | 5/1997  | Aguilera et al. ......... 361/679.43 |
| 5,659,612 | A  | * | 8/1997  | Wang ............................ 379/446 |
| 6,344,727 | B1 | * | 2/2002  | Desai et al. .................... 320/107 |
| 6,856,506 | B2 | * | 2/2005  | Doherty et al. .......... 361/679.27 |
| 7,062,300 | B1 | * | 6/2006  | Kim ........................... 455/569.1 |
| 7,931,505 | B2 | * | 4/2011  | Howard et al. ............... 439/680 |
| 8,056,714 | B2 | * | 11/2011 | Carnevali ...................... 206/320 |
| 8,061,516 | B2 | * | 11/2011 | Carnevali ...................... 206/320 |
| 2002/0024794 | A1 | * | 2/2002 | Lin et al. ...................... 361/686 |
| 2005/0002160 | A1 | * | 1/2005 | Chen et al. .................... 361/683 |
| 2009/0168312 | A1 | * | 7/2009 | Motoe et al. ............. 361/679.01 |

FOREIGN PATENT DOCUMENTS

| TW | 525864 | 10/2001 |
| TW | 571608 | 5/2003 |
| TW | M264742 | 8/2004 |

* cited by examiner

*Primary Examiner* — Anthony Q Edwards
(74) *Attorney, Agent, or Firm* — Schmeiser, Olsen & Watts, LLP

(57) ABSTRACT

An electronic device carrier comprising a base and rolling devices. When an electronic device is removed from a receiving chamber of the base, the rolling devices can reduce friction effectively and resilient force of the rolling device can fix the electronic device in the receiving chamber. The electronic device carrier further includes a transmission unit for transmitting data whenever the electronic device is positioned in the receiving chamber.

11 Claims, 9 Drawing Sheets

ELECTRONIC DEVICE CARRIER

CROSS-REFERENCE TO RELATED APPLICATIONS

This non-provisional application claims priority under 35 U.S.C. §119(a) on Patent Application No(s). 098143445 filed in Taiwan, R.O.C. on 17 Dec. 2009, the entire contents of which are hereby incorporated by reference.

FIELD OF THE INVENTION

The present invention relates to electronic device carriers, and more particularly, to an electronic device carrier that can be removed without producing much fiction and can position the electron device at its location firmly.

BACKGROUND OF THE INVENTION

A conventional electronic device is usually placed on a carrier or usually requires a carrier, for recharging or data transmission purpose. In so doing, friction arises between the electronic device and the carrier while the electronic device is being removed from or placed on the carrier. Plenty of the conventional electronic devices are encapsulated with the protective rubber. In this regard, rubber is notorious known for its excessive friction, which not only prevents the conventional electronic device from being smoothly removed from or positioned in the carrier but also damages the edges of the electronic device or a corresponding portion of the carrier.

The prior art pertaining to reduction of aforesaid friction is disclosed in Taiwan Patent No. 571608, M264742, and 525864. Taiwan Patent No. 571608 discloses a wearproof base structure comprising an elastic structure that has a rubber pad provided on a supporting base such that when the electronic device comes into contact with the rubber pad, it will induce the rubber pad to undergo an elastic deformation after the electronic device is placed on the supporting base. The elasticity derived from deformation provides resistance to the electronic device. However, the wearproof base structure cannot reduce friction at all.

Taiwan Patent No. M264742 discloses a recharger structure, comprising a supporting platform provided thereon with a stop block for limiting the movement of a battery placed on the supporting platform and fixing the battery to the supporting platform. However, the recharger structure is not free from the excessive friction while being removed or positioned.

Taiwan Patent No. 525864 discloses a quick-assembly mobile phone recharger comprising clamping mechanisms that are designed at the sides of a casing of a mobile phone so as to clamp the mobile phone and precisely position the mobile phone in between the clamping mechanisms. However, great friction is generated between the mobile phone and the clamping mechanisms in the course of the removal or the positioning of the mobile phone.

SUMMARY OF THE INVENTION

It is an objective of the present invention to provide an electronic device carrier comprising a rolling element for rolling and thereby having point contact with an electronic device so as to efficiently reduce friction between the electronic device and a base of the electronic device carrier, so as to allow the electronic device to be smoothly removed or positioned, and it protects the electronic device and the base from damage.

Another objective of the present invention is to provide an electronic device carrier, wherein a resilient element of each of the rolling devices exerts a resilient force for driving the rolling element pivotally connected to the resilient element to tightly clamp the electronic device and position the electronic device to a receiving chamber of the electronic device carrier firmly.

Yet another objective of the present invention is to provide an electronic device carrier comprising a transmission unit whereby the data transmission between the transmission unit and the electronic device takes place.

The electronic device carrier of the present invention comprises a base and two rolling devices. The base is concavely provided with a receiving chamber. The base has two sidewalls located at two opposing ends of the receiving chamber respectively. Each of two sidewalls is concavely provided with a chamber opening facing toward the receiving chamber.

The two rolling devices each comprise a resilient element and a rolling element. The resilient element of each of the rolling devices is coupled to the base and is extended toward the chamber opening of a corresponding one of the sidewalls until the resilient element is provided with a pivotally connecting end. The resilient element of each of the rolling devices exerts a resilient force toward the receiving chamber. The rolling element of each of the rolling devices is pivotally connected to the pivotally connecting end, and is located in the chamber opening of each of the sidewalls, and each rolling element is protruded toward the receiving chamber.

When the electronic device is positioned in the receiving chamber of the base or removed from the receiving chamber of the base, the electronic device comes into contact with the rolling element of the rolling devices. Consequently, the rolling movement of the rolling element provides the point contact between the rolling element and the electronic device, thus the friction between the electronic device and the base is effectively reduced. As a result, the removal and positioning of the electronic device is smooth, and the electronic device or the base is protected from damage.

When the electronic device is positioned in the receiving chamber of the base, the resilient element of each of the rolling devices exerts a resilient force for driving the rolling element pivotally connected to the resilient element to tightly clamp the electronic device and fixing the electronic device to the receiving chamber.

In another embodiment of the present invention, the electronic device carrier comprises a base, two rolling devices, and a transmission unit. The base is concavely provided with a receiving chamber. The base has two sidewalls located at two opposing facing of the receiving chamber respectively. The sidewalls are each concavely provided with a chamber opening open to the receiving chamber.

The two rolling devices each comprise a resilient element and a rolling element. The resilient element of each of the rolling devices is coupled to the base and extends toward the chamber opening of a corresponding one of the sidewalls until the resilient element is provided with a pivotally connecting end. The resilient element of each of the rolling devices exerts a resilient force toward the receiving chamber. The rolling element of each of the rolling devices is pivotally connected to the pivotally connecting end, received in the chamber opening of each of the sidewalls, and protruding toward the receiving chamber.

The transmission unit comprises a control panel and an electrical connector electrically connected to the control panel. The control panel is internally coupled to the base. The electrical connector is coupled to the base and exposed to the receiving chamber.

Accordingly, in addition to the aforesaid effects, the electronic device carrier enables data transmission between the transmission unit and the electronic device when the electronic device is positioned in the receiving chamber of the base.

DETAILED DESCRIPTION OF THE EMBODIMENTS

Figure 1:
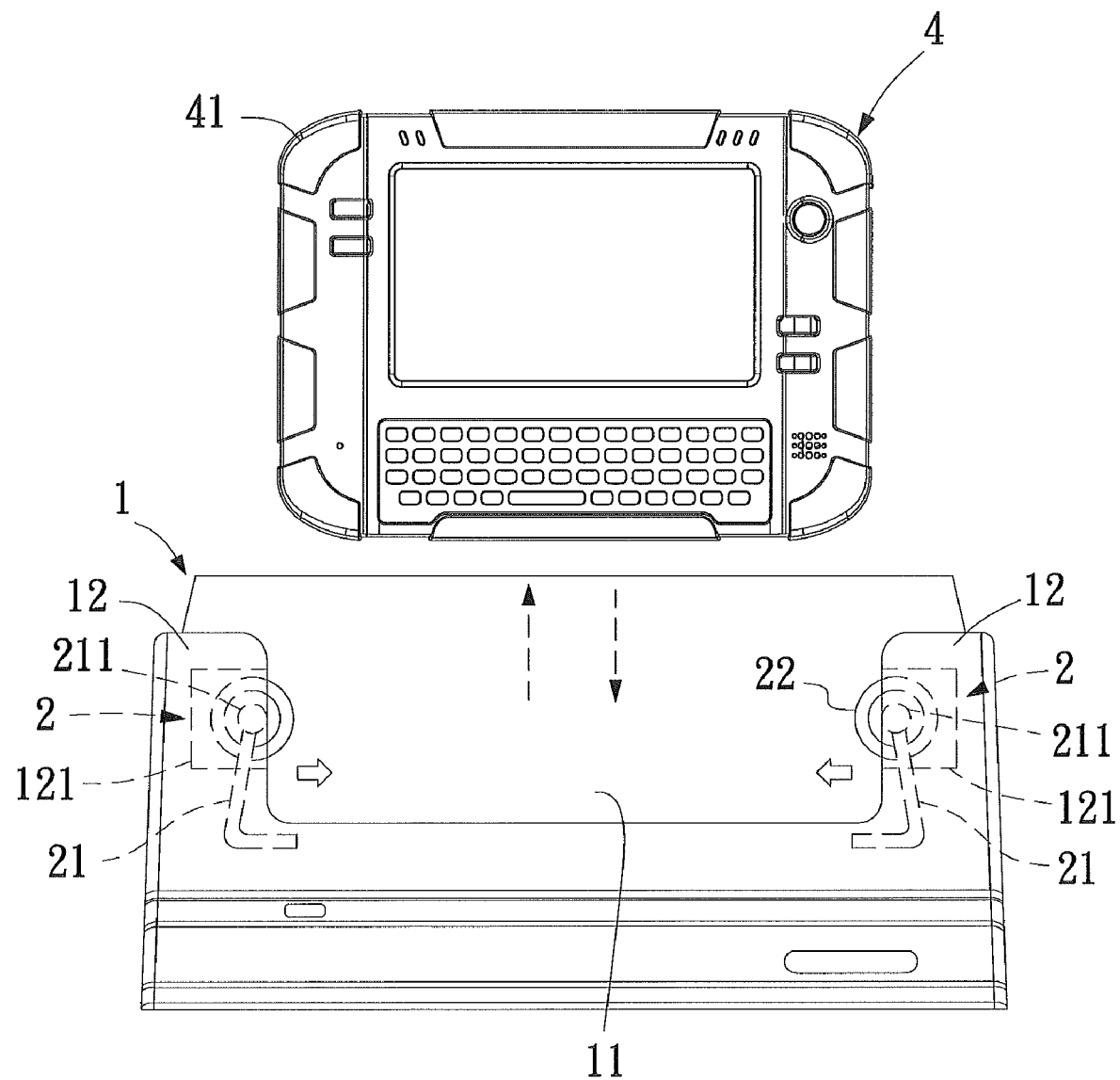
FIG. 1 is a schematic view of the first embodiment of the present invention.

Referring to FIG. 1 through FIG. 9, in an embodiment of the present invention, an electronic device carrier is configured to carry an electronic device 4 having two opposing sides. The electronic device carrier comprises a base 1 and two rolling devices 2. The base 1 has a receiving chamber 11 for receiving the electronic device 4. The two rolling devices 2 are provided at two sidewalls 12 of the two ends of the receiving chamber 11 respectively, and are utilized for rotational contact with the sides of the electronic device 4. The base 1 is concavely provided with the receiving chamber 11 and has two sidewalls 12 positioned at the two opposing ends of the receiving chamber 11, respectively. Each of two said sidewalls 12 is concavely provided with a chamber opening 121 facing to the receiving chamber 11. Each of two rolling devices 2 comprises a resilient element 21 and a rolling element 22. The resilient element 21 of each of the rolling devices 2 is coupled to the base 1 and is extended toward the chamber opening 121 of the corresponding sidewall 12 until the resilient element 21 is provided with a pivotally connecting end 211. The resilient element 21 exerts a resilient force toward the receiving chamber 11. Each of the rolling element 22 of the rolling devices 2 is pivotally connected to the pivotally connecting end 211, and is received in the chamber opening 121 of each of the sidewalls 12, and is protruded toward the receiving chamber 11.

In another embodiment of the present invention, the electronic device carrier is configured to carry the electronic device 4 having the two opposing sides. The electronic device carrier comprises the base 1, the two rolling devices 2, and a transmission unit 3. The base 1 has the receiving chamber 11 for receiving the electronic device 4. The two rolling devices 2 are provided at the two sidewalls 12 of the receiving chamber 11 respectively for rotational contact with the sides of the electronic device 4. The transmission unit 3 comprises a control panel 31 and an electrical connector 32. The electrical connector 32 is electrically connected to the control panel 31. The control panel 31 is internally coupled to the base 1. The electrical connector 32 is coupled to the base 1 and exposed to the receiving chamber 11. The base 1 is concavely provided with the receiving chamber 11 and has two said sidewalls 12 positioned at the two opposing ends of the receiving chamber 11, respectively. Each of the sidewalls 12 is concavely provided with the chamber opening 121 facing to the receiving chamber 11. Each of the two rolling devices 2 comprises the resilient element 21 and the rolling element 22. Each of the resilient element 21 of the rolling devices 2 is coupled to the base 1 and extended toward the chamber opening 121 of the corresponding sidewall 12 until the resilient element 21 is provided with the pivotally connecting end 211. The resilient element 21 exerts a resilient force toward the receiving chamber 11. The rolling element 22 of each of the rolling devices 2 is pivotally connected to the pivotally connecting end 211, received in the chamber opening 121 of each of the sidewalls 12, and protruding toward the receiving chamber 11. The transmission unit 3 comprises the control panel 31 and the electrical connector 32 electrically connected to the control panel 31. The control panel 31 is internally coupled to the base 1. The electrical connector 32 is coupled to the base 1 and exposed to the receiving chamber 11.

As disclosed in the present invention, no limitation is imposed upon the direction in which the receiving chamber 11 of the base 1 is open to the outside. In practices, the direction is upward, leftward, or rightward. Where the receiving chamber of the base is open upward, the two sidewalls 12 stand erect on the left and the right of (or in front of and behind) the receiving chamber 11 respectively. Where the receiving chamber of the base is open leftward or rightward, the two sidewalls 12 lie above and below the receiving chamber 11, respectively.

The resilient element 21 and the rolling element 22 of the rolling devices 2 come in different forms. For instance, the resilient element 21 can be a flexible rod, a spring, a leaf spring, or any element that manifests resilience. The rolling element 22 can be a roller, a ball, or a cylinder and can have a round cross-section or arc-shaped cross-section.

Various embodiments of the present invention are described in detail hereunder.

Referring to FIG. 1, there is shown a schematic view of an embodiment of an electronic device carrier according to the present invention. As shown in the drawing, the base 1 is concavely provided with the receiving chamber 11 open upward, and the electronic device 4 can be removed from or positioned in the receiving chamber 11 in the directions indicated by arrows shown in FIG. 1.

Two sidewalls 12 stand erect on the left and the right of the receiving chamber 11 of the base 1 respectively. Each of the sidewalls 12 is concavely provided with the chamber opening 121 facing to the receiving chamber 11.

Referring to FIG. 1, each of two rolling devices 2 comprises the resilient element 21 and the rolling element 22. In this embodiment, the resilient element 21 is a flexible rod, and the rolling element 22 is a roller with a round cross-section.

Each of the resilient element 21 of the rolling devices 2 is coupled to the base 1 and extended toward the chamber opening 121 of the corresponding sidewall 12 until the resilient element 21 is provided with the pivotally connecting end 211. The two resilient elements 21 exert a resilient force toward the receiving chamber 11 (in the directions indicated by the arrows shown). Each of the rolling element 22 of the rolling devices 2 is pivotally connected to the pivotally connecting end 211 of the resilient element 21, and is received in the chamber opening 121 of each sidewall 12, and is protruded toward the receiving chamber 11.

Figure 2:
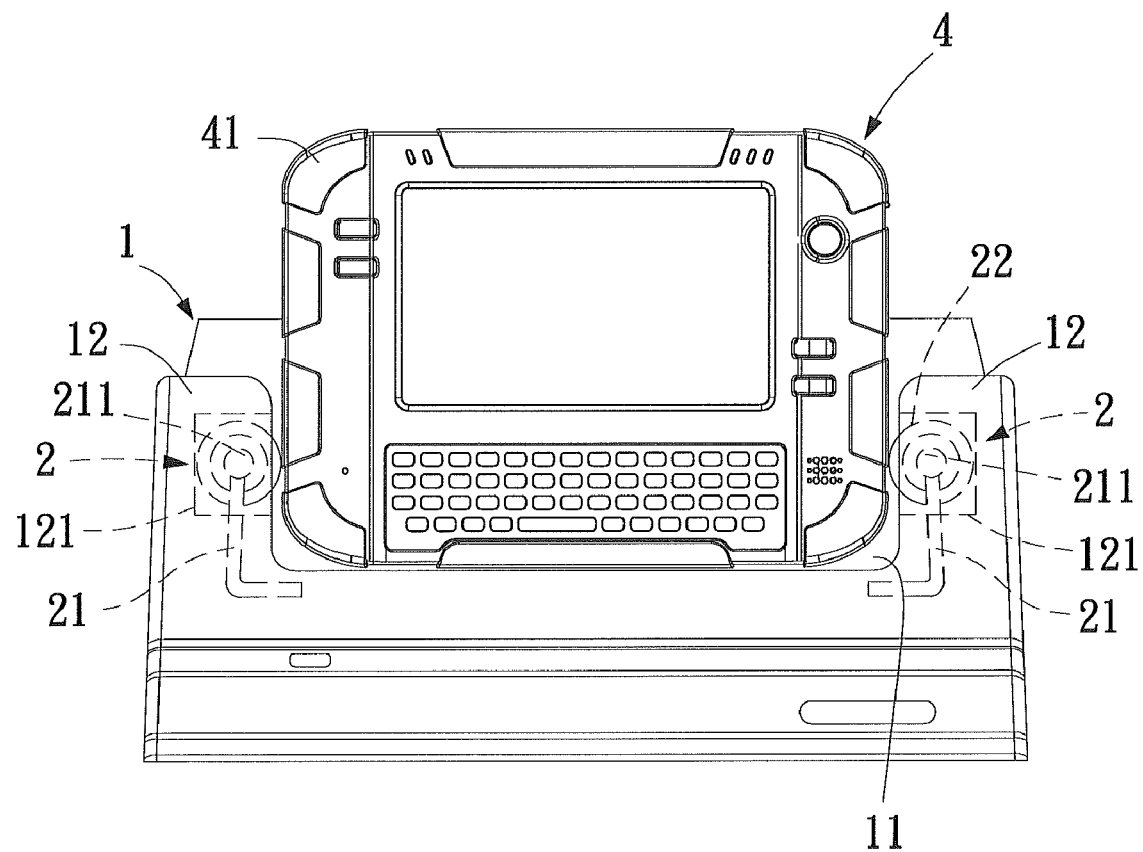
FIG. 2 is another schematic view of the first embodiment of the present invention.

Referring to FIG. 2, when the electronic device 4 is positioned in the receiving chamber 11 of the base 1 (or is removed from the receiving chamber 11), (protective rubber 41 of) the electronic device 4 comes into contact with the rolling element 22 of the rolling devices 2, and the rolling element 22 rolls to provide point contact between the rolling element 22 and (the protective rubber 41 of) the electronic device 4, and in consequence, the friction between the electronic device 4 and the base 1 is effectively reduced. As a result, the removal and positioning of the electronic device 4 is smoothly operated, and the electronic device 4 or the base 1 is protected from any damage.

Referring to FIG. 2, when the electronic device 4 is positioned in the receiving chamber 11 of the base 1, each of the resilient elements 21 of the rolling devices 2 exerts a resilient force for driving the rolling element 22 pivotally connected to the resilient element 21 to tightly clamp the electronic device 4, and fix the electronic device 4 to the receiving chamber 11, and thereby prevent the displacement of the electronic device 4.

Figure 3:
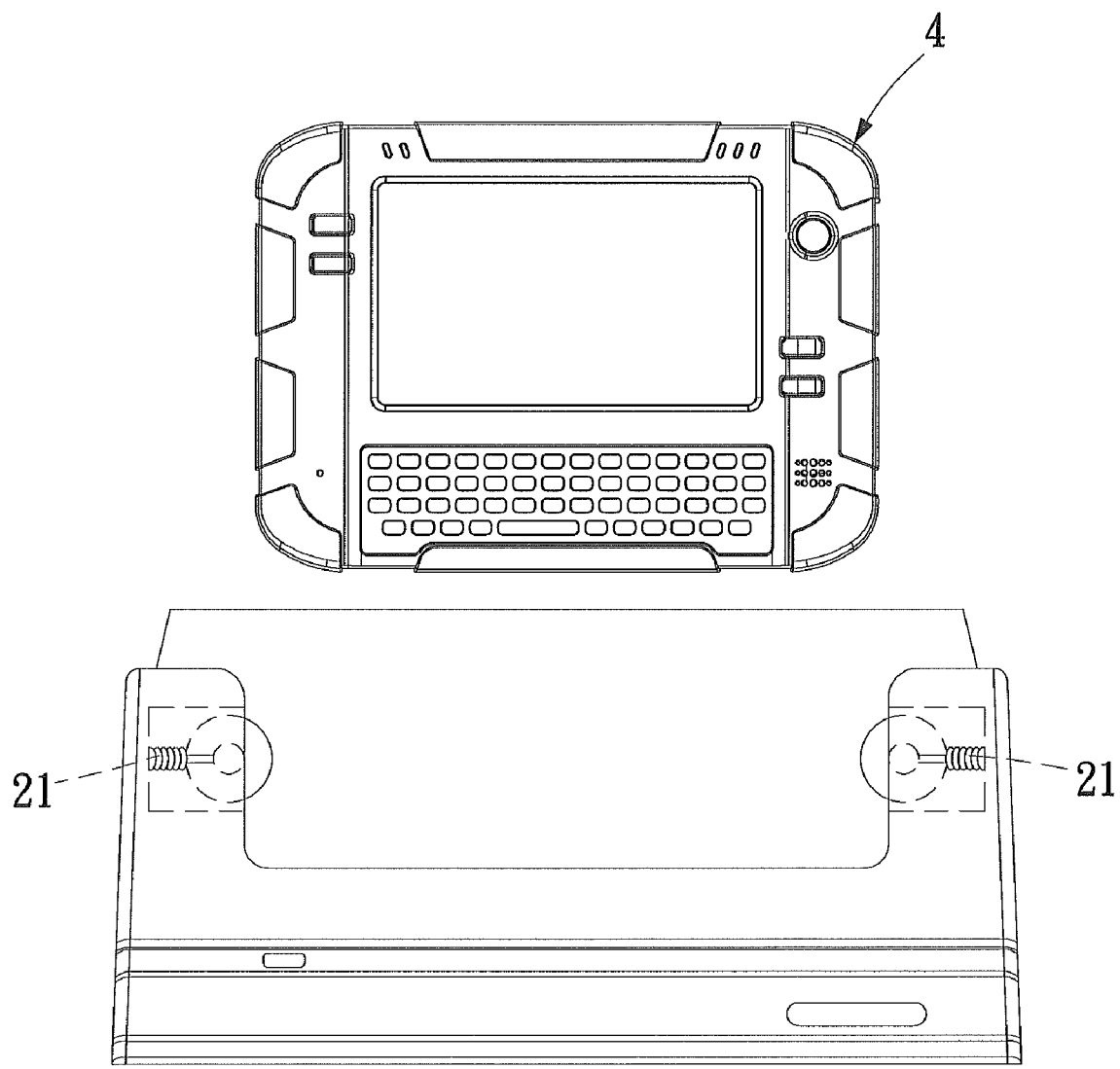
FIG. 3 is a schematic view of the second embodiment of the present invention.
Figure 4:
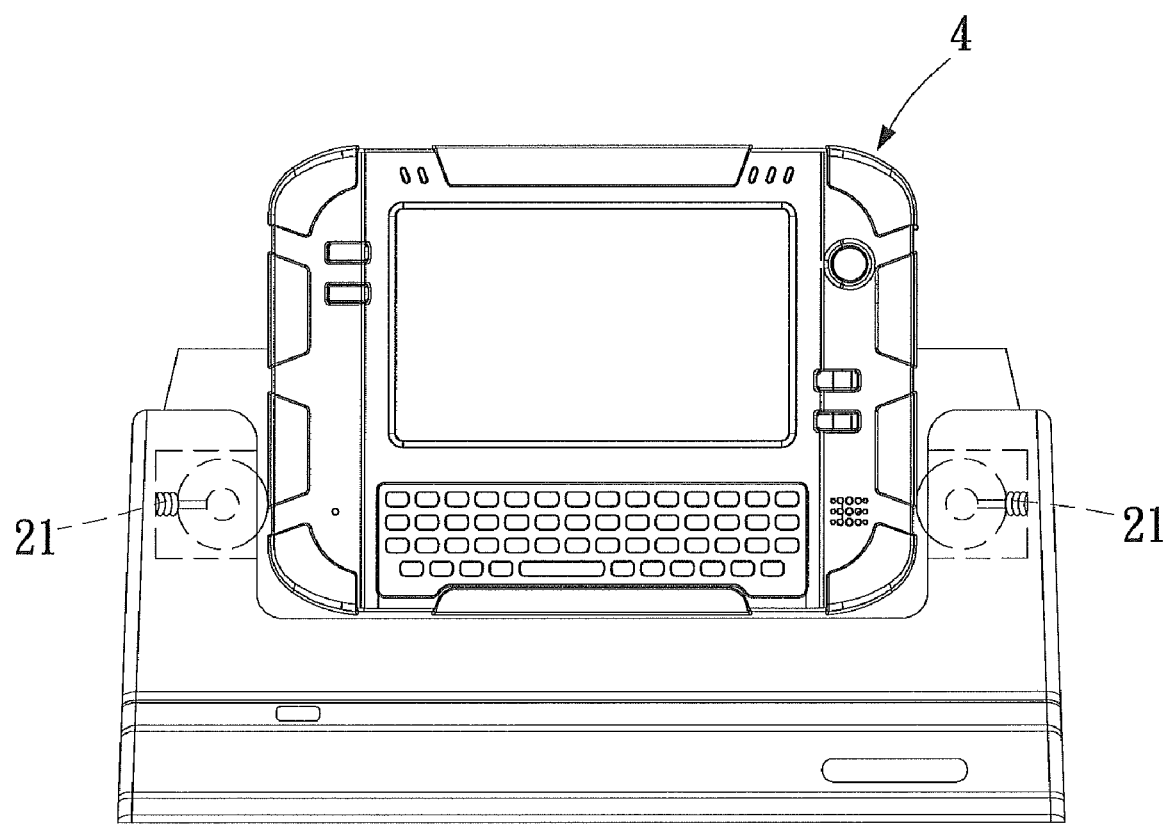
FIG. 4 is another schematic view of the second embodiment of the present invention.

Referring to FIG. 3 and FIG. 4, there are shown schematic views of another embodiment of the electronic device carrier according to the present invention. The main structure is the same as the embodiments described above. As shown in the drawing, this embodiment differs from the preceding embodiment in that, in this embodiment, the resilient element 21 is replaced by a spring but it still achieves the same effects as in the preceding embodiment.

Figure 5:
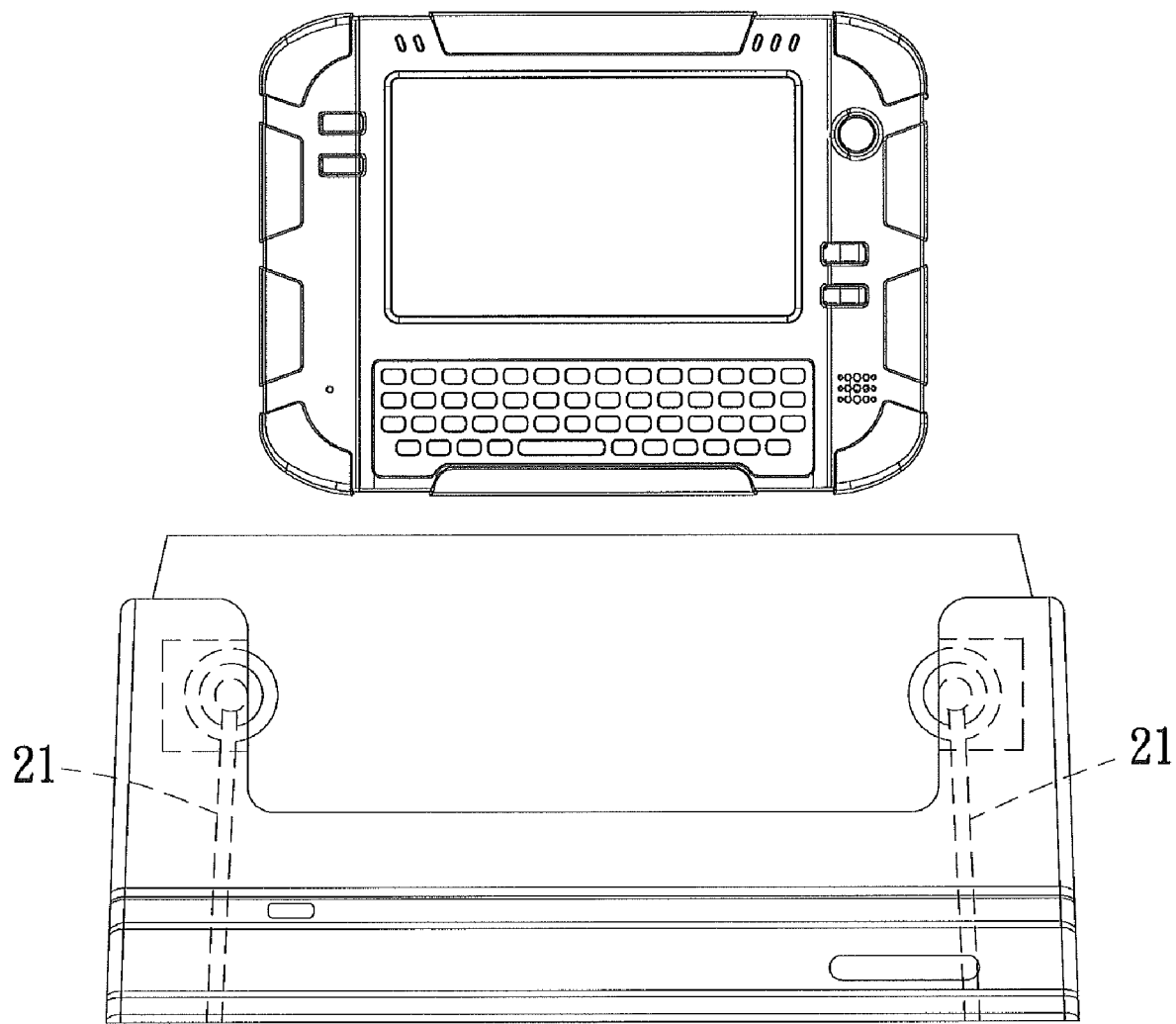
FIG. 5 is a schematic view of the third embodiment of the present invention.
Figure 6:
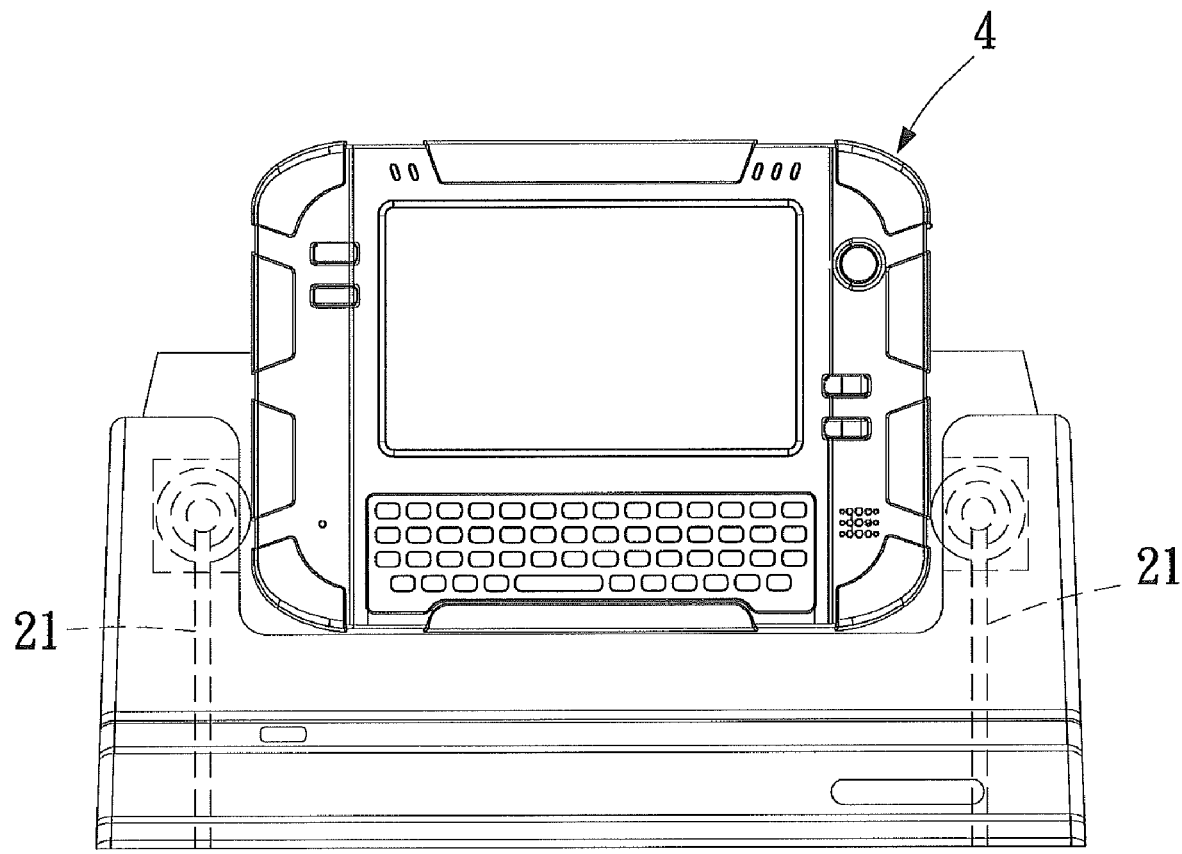
FIG. 6 is another schematic view of the third embodiment of the present invention.

Referring to FIG. 5 and FIG. 6, there are shown schematic views of yet another embodiment of the electronic device carrier according to the present invention. The main structure is the same as the embodiments described above. As shown in the drawing, this embodiment differs from the preceding embodiments in that, in this embodiment, the resilient element 21 is replaced by a leaf spring but it still achieves the same effects as in the preceding embodiments.

Figure 7:
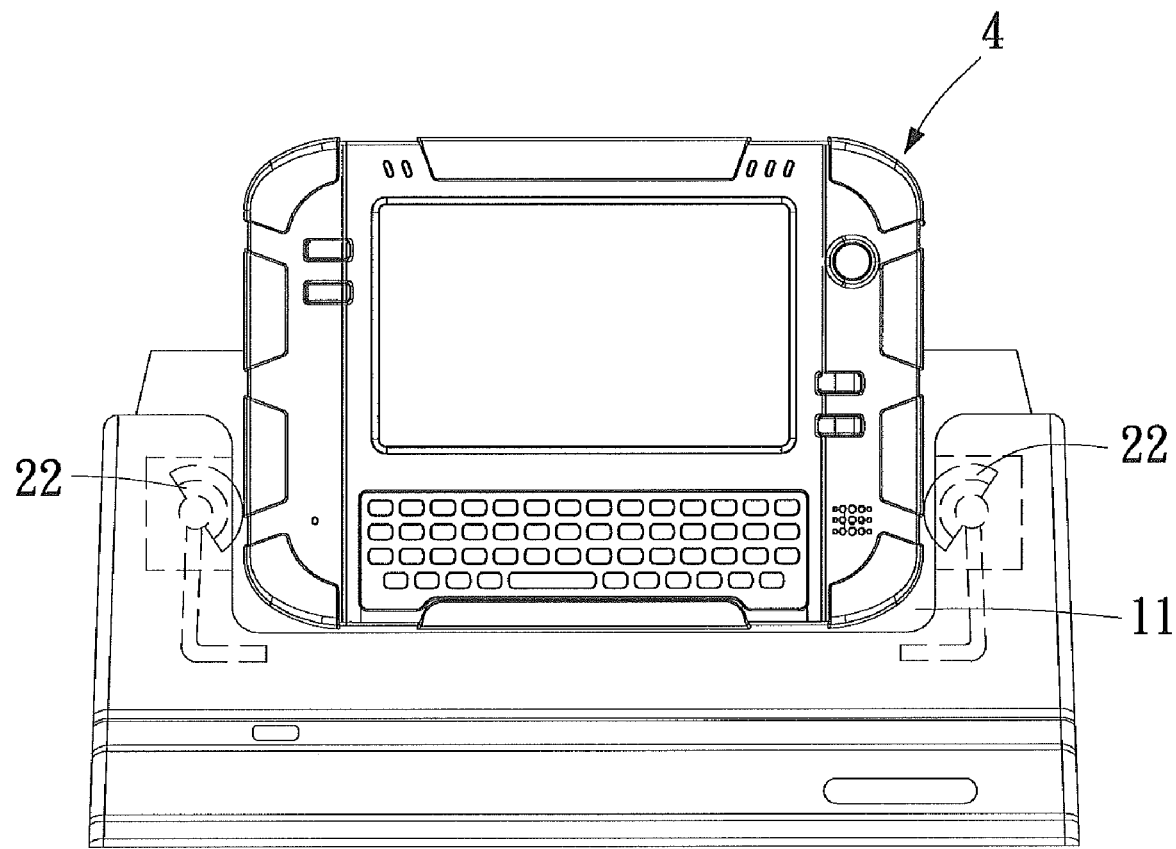
FIG. 7 is a schematic view of the fourth embodiment of the present invention.

Referring to FIG. 7, there is shown a schematic view of a further embodiment of the electronic device carrier according to the present invention. The main structure is the same as the embodiments described above. As shown in the drawing, this embodiment differs from the preceding embodiments in that, in this embodiment, the rolling element 22 is a roller with an arc-shaped cross-section whereby the size of the roller can be adjusted according to the stroke (depth) of the removal and positioning (plugging and unplugging) of the electronic device 4 in the receiving chamber 11 with a view to saving materials.

Figure 8:
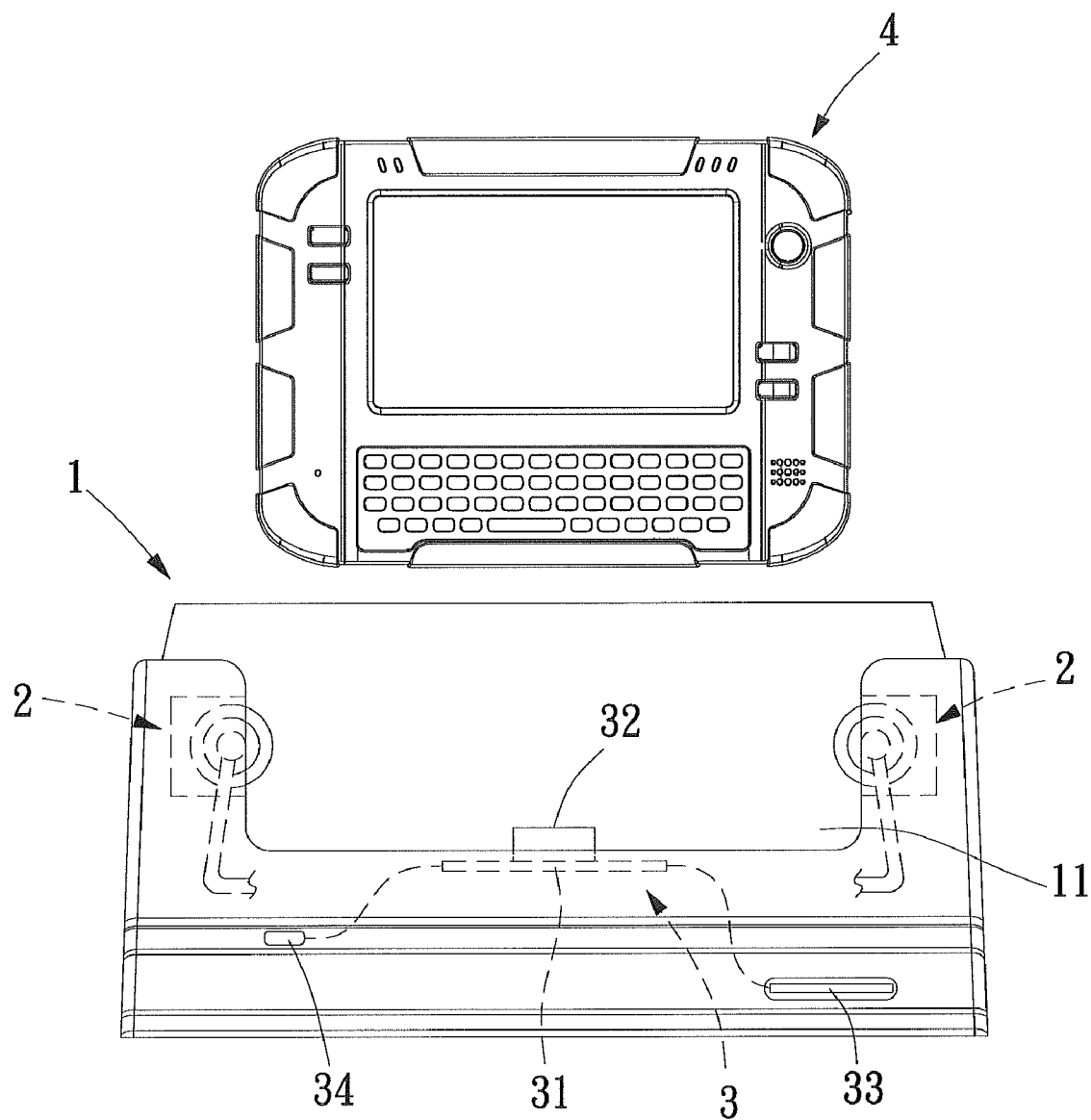
FIG. 8 is a schematic view of the fifth embodiment of the present invention.
Figure 9:
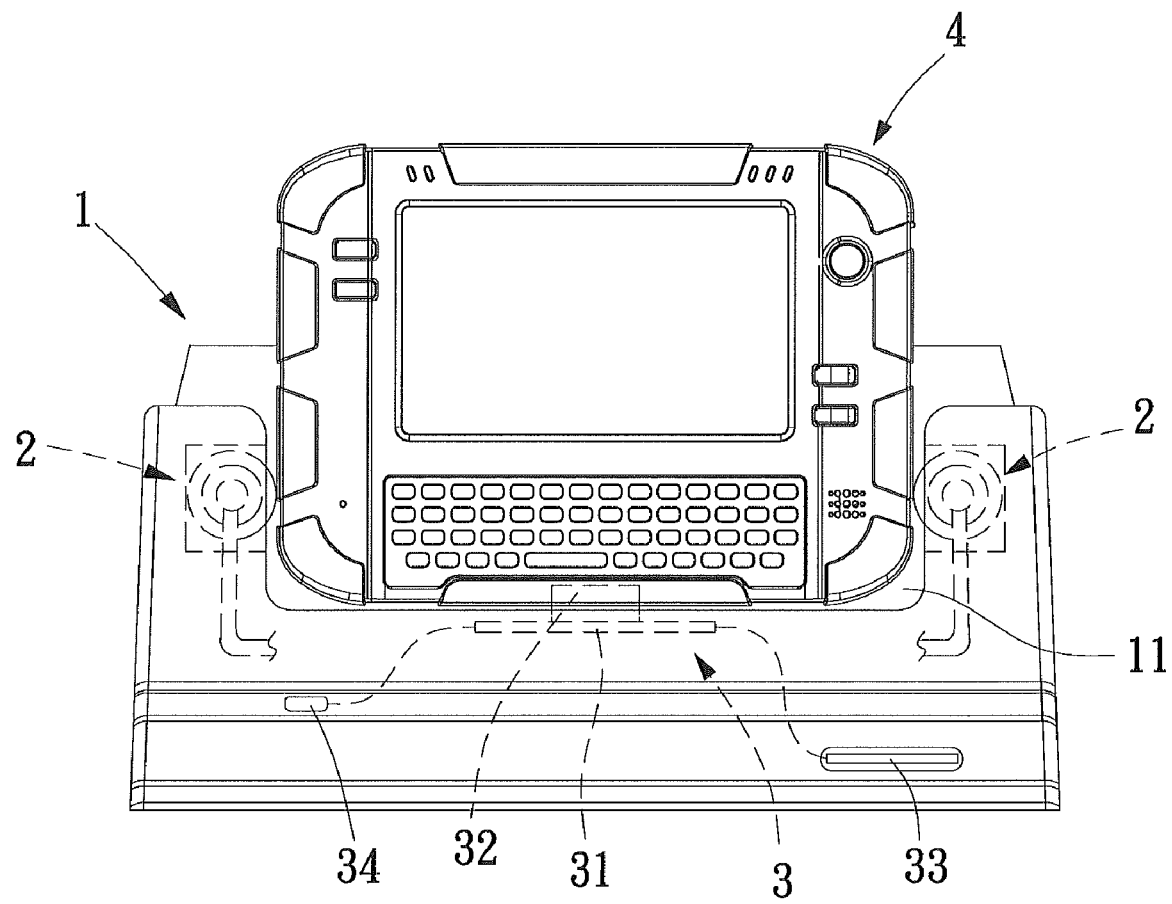
FIG. 9 is another schematic view of the fifth embodiment of the present invention.

Referring to FIG. 8 and FIG. 9, there are shown schematic views of a further embodiment of the electronic device carrier according to the present invention. As shown in the drawing, the electronic device carrier comprises the base 1, the two rolling devices 2, and the transmission unit 3. This embodiment is structurally the same as the preceding embodiments in terms of the base 1 and the two rolling devices 2. In this embodiment, the transmission unit 3 comprises the control panel 31 and the electrical connector 32 electrically connected to the control panel 31. The control panel 31 is internally coupled to the base 1. The electrical connector 32 is coupled to the base 1 and exposed to the receiving chamber 11

The electronic device 4 is connected to the electrical connector 32 for the purpose of data transmission as soon as the electronic device 4 is positioned in the receiving chamber 11 of the base 1.

In the embodiment illustrated with FIG. 8 and FIG. 9, the transmission unit 3 further comprises an electrical slot 33 and an indicator 34, wherein the electrical slot 33 and the indicator 34 are electrically connected to the control panel 31.

Hence, with the indicator 34, it is feasible to determine whether the base 1 is operating. The electrical slot 33 functions as an expansion slot, such as a slot for a memory card. The quantity of the electrical slots 33 and the indicators 34 is subject to changes as needed.

The base 1 can be provided with a built-in battery (not shown) or can be connected to an external power supply (not shown) so as to be supplied with electric power. The electronic device 4 can be positioned in the receiving chamber 11 and connected to the electrical connector 32 so as to be recharged.

As revealed by the above description, persons skilled in the art can readily understand that the present invention can also be implemented by other embodiments, and thus the above embodiments serve an illustrative purpose only. The spirit and the disclosure of the present invention shall be defined by the scope of the present invention as set forth in the appended claims hereunder.

What is claimed is:

1. An electronic device carrier, configured to carry an electronic device having two opposing sides, comprising:
a base having a receiving chamber for receiving the electronic device; and
two rolling devices provided at two sidewalls of the receiving chamber respectively for rotational contact with the two opposing sides of the electronic device;
wherein each of the two sidewalls of the receiving chamber is concavely provided with a chamber opening facing toward the receiving chamber, and each of the two rolling devices comprises a resilient element and a rolling element, the resilient element being coupled to the base and extending toward the chamber opening of a corresponding one of the two sidewalls until the resilient element is provided with a pivotally connecting end, the resilient element exerts a resilient force toward the receiving chamber;
wherein at least one of the two rolling devices is a roller having an arc-shaped cross-section, the roller being pivotally connected to the pivotally connecting end, received in the chamber opening of each of the two sidewalls, and protruding toward the receiving chamber, further wherein the roller provides a point contact between the rolling element and the electronic device via a part of the arc-shaped cross-section of the roller;
wherein a size of the roller is adjusted according to a depth of a removal and a positioning of the electronic device in the receiving chamber.

2. The electronic device carrier of claim 1, wherein the receiving chamber is open upward, and the two sidewalls stand erect on two opposing sides of the receiving chamber, respectively.

3. The electronic device carrier of claim 1, wherein the resilient element of the two rolling devices is a flexible rod.

4. The electronic device carrier of claim 1, wherein the resilient element of the two rolling devices is a spring.

5. The electronic device carrier of claim 1, wherein the resilient element of the two rolling devices is a leaf spring.

6. The electronic device carrier of claim 1, wherein each rolling element of the rolling devices has a round cross-section.

7. The electronic device carrier of claim 1, wherein each rolling element has an arc-shaped cross-section.

8. The electronic device carrier of claim 1, wherein rolling element of the two rolling devices is a roller.

9. An electronic device carrier, configured to carry an electronic device having two opposing sides, comprising:

a base having a receiving chamber for receiving the electronic device;

two rolling devices provided at two sidewalls of the receiving chamber respectively for rotational contact with the two opposing sides of the electronic device; and a transmission unit comprising a control panel and an electrical connector, wherein the electrical connector is electrically connected to the control panel, and the control panel is internally coupled to the base, and the electrical connector is coupled to the base and exposed to the receiving chamber;

wherein each of the two sidewalls of the receiving chamber is concavely provided with a chamber opening facing toward the receiving chamber, and each of the two rolling devices comprises a resilient element and a rolling element, the resilient element being coupled to the base and extending toward the chamber opening of a corresponding one of the two sidewalls until the resilient element is provided with a pivotally connecting end, the resilient element exerting a resilient force toward the receiving chamber;

wherein at least one of the rolling elements of the two rolling devices is a roller having an arc-shaped cross-section, the roller being pivotally connected to the pivotally connecting end, received in the chamber opening of each of the two sidewalls, and protruding toward the receiving chamber, further wherein the roller provides a point contact between the rolling element and the electronic device via a part of the arc-shaped cross-section;

wherein a size of the roller is adjusted according to a depth of a removal and a positioning of the electronic device in the receiving chamber.

10. The electronic device carrier of claim 9, wherein the transmission unit further comprises at least one electrical slot electrically connected to the control panel.

11. The electronic device carrier of claim 9, wherein the transmission unit further comprises at least one indicator electrically connected to the control panel.

* * * * *